United States Patent
Kai et al.

(10) Patent No.: US 7,058,436 B2
(45) Date of Patent: Jun. 6, 2006

(54) SUPERCONDUCTING FILTER APPARATUS AND WIRELESS RECEIVING AMPLIFIER HAVING AN ABNORMALITY DISCRIMINATING CIRCUIT

(75) Inventors: Manabu Kai, Kawasaki (JP); Toru Maniwa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/630,013

(22) Filed: Jul. 30, 2003

(65) Prior Publication Data
US 2004/0041655 A1    Mar. 4, 2004

Related U.S. Application Data

(63) Continuation of application No. PCT/JP01/01281, filed on Feb. 22, 2001.

(51) Int. Cl.
*H01B 12/02* (2006.01)
*H01P 1/203* (2006.01)

(52) U.S. Cl. .................. 505/210; 505/163; 505/847; 505/888; 333/99 S; 333/204; 333/15; 333/16

(58) Field of Classification Search ............... 333/15, 333/16, 99 S, 204; 505/163, 210, 847, 888
See application file for complete search history.

(56) References Cited

U.S. PATENT DOCUMENTS 2,626,993 A  *  1/1953 Wright et al.
6,587,012 B1 *  7/2003 Farmer et al. .............. 333/15

FOREIGN PATENT DOCUMENTS

| JP | 49-49367   | 12/1974 |
| JP | 55-74247   | 6/1980  |
| JP | 57-68936   | 4/1982  |
| JP | 61-12140   | 1/1986  |
| JP | 6-37513    | 2/1994  |
| JP | 10-89787   | 4/1998  |
| JP | 10-224269  | 8/1998  |
| JP | 11-340744  | 12/1999 |

OTHER PUBLICATIONS

Yasunao Okazaki, et al. Investigation of Superconducting Microstripline Resonators by Electromagnetic Field Simulation. Technical Report of IEICEApr. 1997, pp. 13-18 (translation pp. 1-9).

* cited by examiner

*Primary Examiner*—Benny T. Lee
(74) *Attorney, Agent, or Firm*—Katten Muchin Rosenman LLP

(57) ABSTRACT

A superconducting filter apparatus having a refrigerator for cooling the superconducting filter to cryogenic temperatures, a pilot signal generator for generating a pilot signal that is outside the pass band and inputting the pilot signal to the superconducting filter together with an antenna receive signal, and a discriminating unit for discriminating abnormality in the refrigerator. If the refrigerator malfunctions and temperature of the superconducting filter rises, the pass band of the superconducting filter shifts to the low-frequency side and crosses the frequency of the pilot signal. The pilot signal passes through the superconducting filter at this time. The discriminating unit discriminates abnormality in the refrigerator based upon the pilot signal contained in the output of the superconducting filter.

2 Claims, 16 Drawing Sheets

FIG. 3
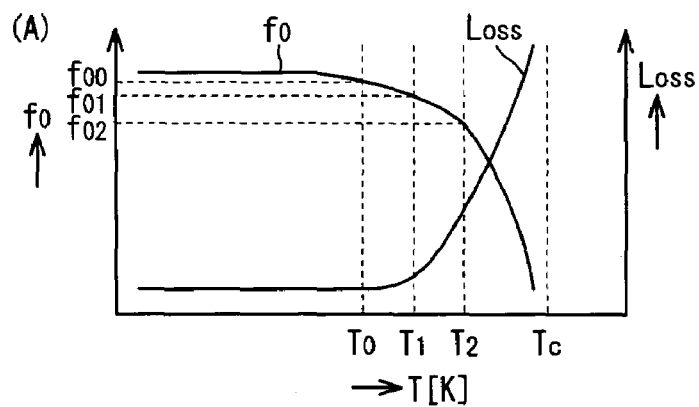
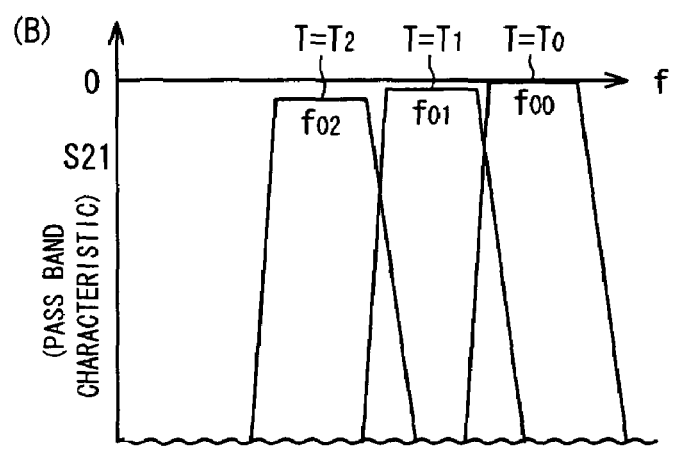
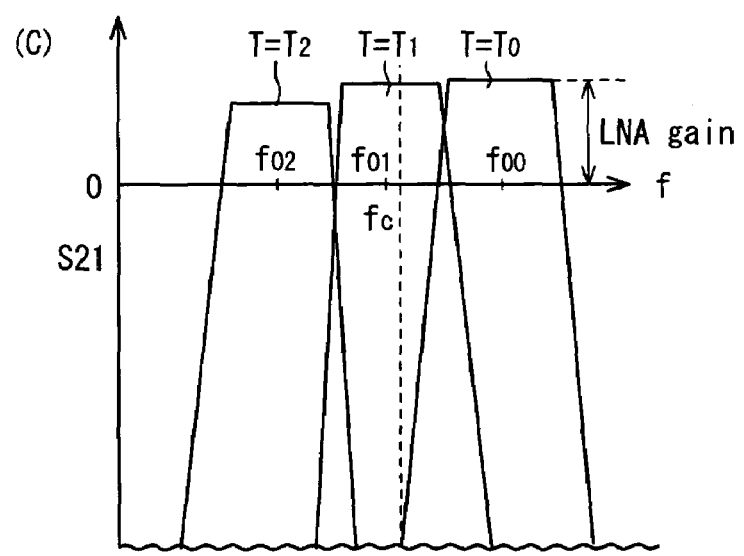

FIG. 10
(A) 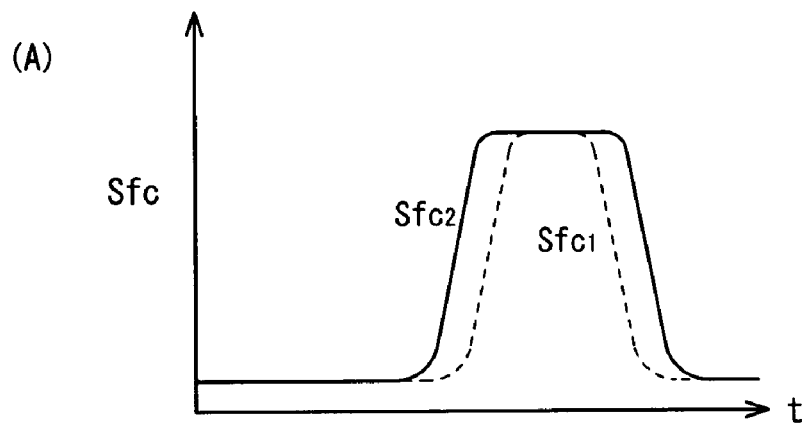
(B) 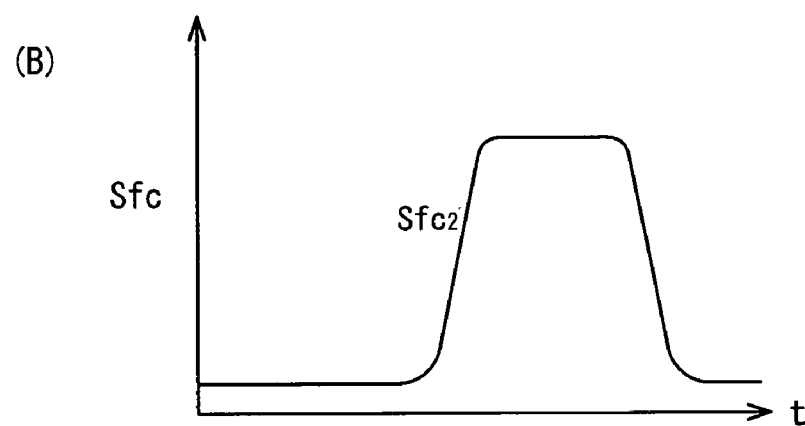
(C) 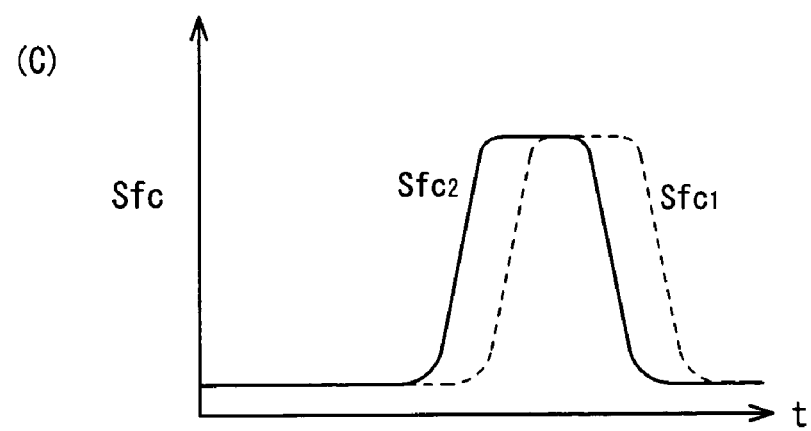

FIG. 14
(A)
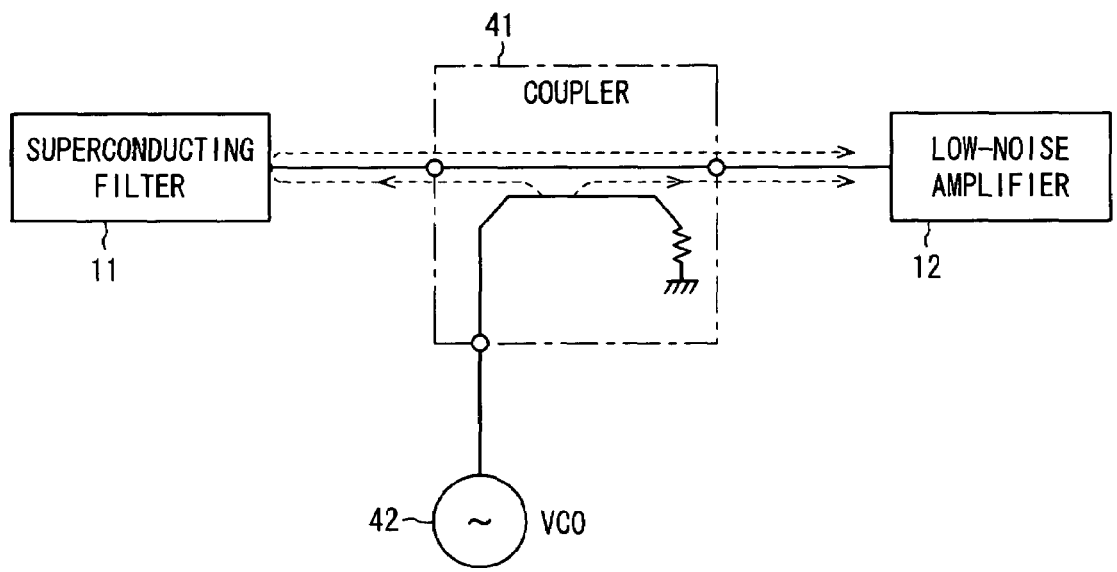
(B)
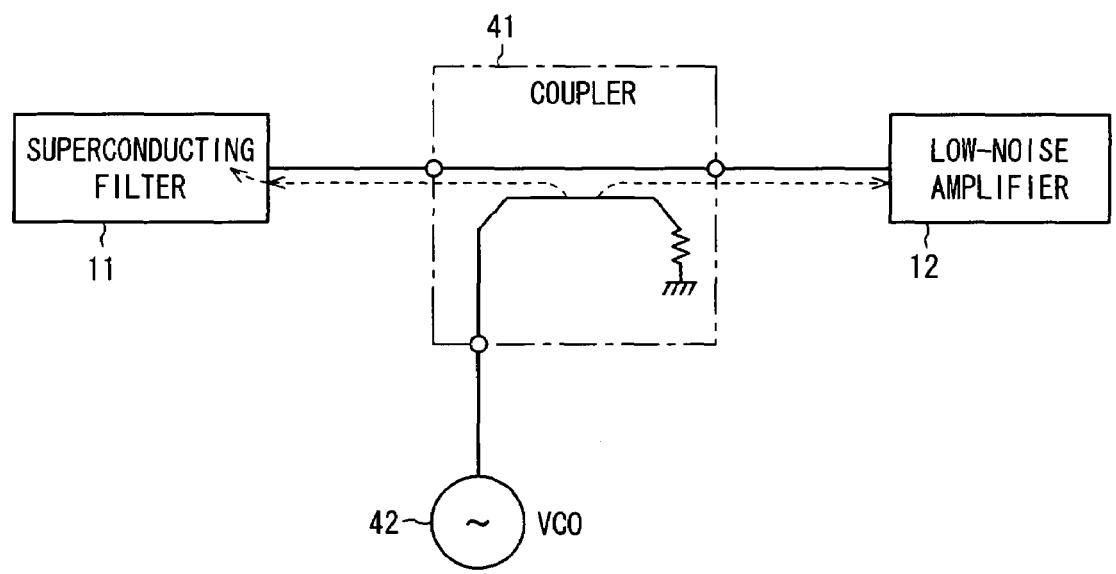

| Case | 1 | 2 | 3 | 4 | 5 |
|---|---|---|---|---|---|
| Sfc | NOT DETECTED | NOT DETECTED | NOT DETECTED | DETECTED | DETECTED |
| SfL | NO CHANGE IN LEVEL | DECLINES BY $L_D$(dB) | DECLINES BY ANY LEVEL | DECLINES BY $L_D$(dB) | DECLINES BY MORE THAN $L_D$(dB) |
| REFRIGERATOR | NORMAL | NORMAL | NORMAL | ABNORMAL | ABNORMAL |
| LOW-NOISE AMPLIFIER | NORMAL | ABNORMAL | ABNORMAL | NORMAL | ABNORMAL |

FIG. 20 PRIOR ART
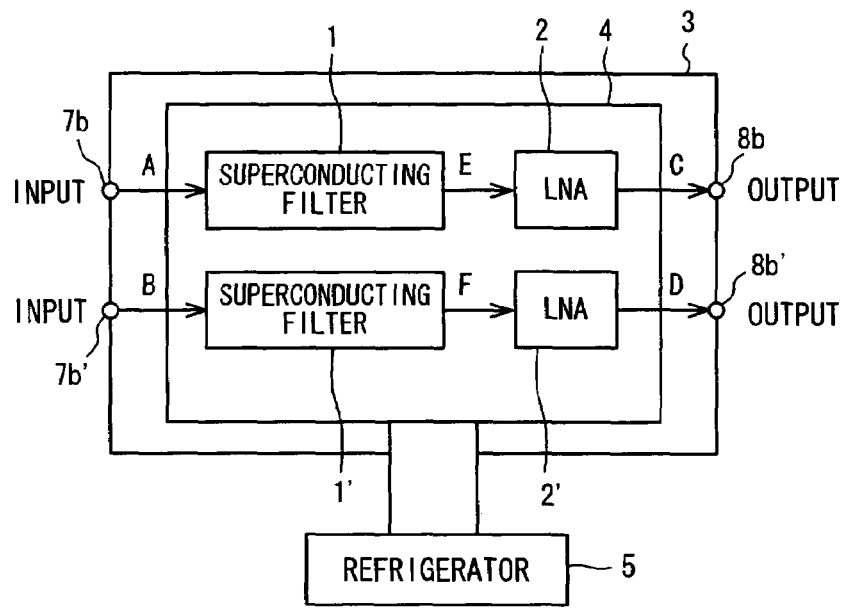
FIG. 21 PRIOR ART
(A)
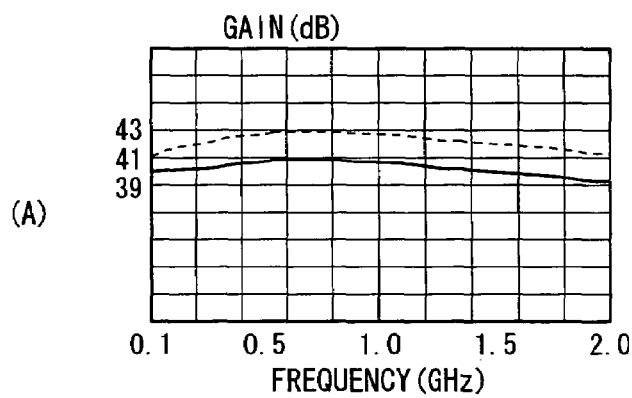
(B)
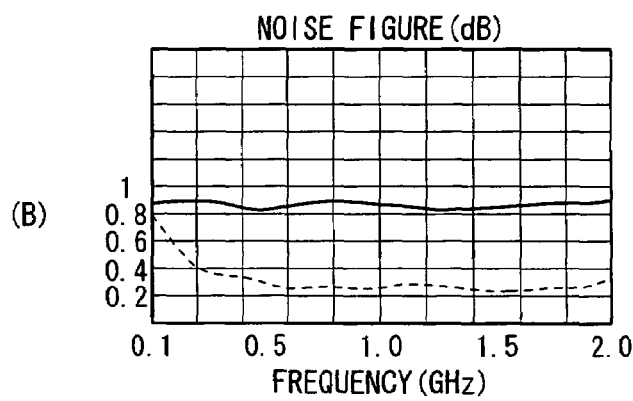

US 7,058,436 B2

SUPERCONDUCTING FILTER APPARATUS AND WIRELESS RECEIVING AMPLIFIER HAVING AN ABNORMALITY DISCRIMINATING CIRCUIT

CROSS REFERENCE TO RELATED APPLICATION

The present application is a continuation of International Application No. PCT/JP01/01281 which was filed on Feb. 22, 2001.

BACKGROUND OF THE INVENTION

This invention relates to a superconducting filter apparatus used at a base station in mobile communications, and to a wireless receiving amplifier having a superconducting filter. More particularly, the invention relates to a superconducting filter apparatus that is capable of rapidly detecting an abnormality in a refrigerator, and a wireless receiving amplifier having a superconducting filter.

Generally, in order to obtain a steep cut-off characteristic in a communications filter, the number of filter stages must be increased. However, a problem which arises is a commensurate increase in loss in the pass band. Accordingly, note has been taken of the fact that a superconductor has a resistance that is lower than that of ordinary metals by two to three orders of magnitude, and a superconducting filter that holds loss in the pass band to the minimum has been put into practical use employing a superconductor as the conductor of the filter. Such a superconducting filter has become the focus of much attention in recent years for the purpose of effectively utilizing frequency in mobile communications, increasing subscriber capacity and increasing base-station coverage area, etc. A known example of a superconducting material for a superconducting filter is YBCO (Y—Ba—Cu—O), which has a critical temperature ($T_c$) on the order of 90 K. This material is used at a temperature $T_c$ on the order of 70 K, which is a temperature at which superconducting characteristics are stable.

FIG. 18 is a diagram showing the structure of a conventional wireless receiving amplifier having a superconducting filter. A superconducting filter (SCF) 1 and low-noise amplifier (LNA) 2 are secured to a cold head 4 and accommodated within a vacuum vessel 3. The cold head 4 is cooled by a refrigerator 5. The superconducting filter 1 and low-noise amplifier 2 are cooled by the refrigerator 5 via the cold head 4 and operate at $T_c$=70 K. The vacuum vessel 3 and refrigerator 5 are disposed in a case 6 in such a manner that outdoor installation is possible. Terminals 7a, 7b and 8a, 8b provided on the case 6 and vacuum vessel 3 are connected by coaxial cables 9a, 9b, respectively, and terminal 7b, superconducting filter 1, low-noise amplifier 2 and terminal 8b are connected by a coaxial cable 9c.

As shown in FIGS. 19(A), 19(B), the superconducting filter 1 has a structure in which a filter electrode 1b (see FIG. 19(A)) and an n-stage (n=5 in the illustration) λ/2 resonator 1c (see FIG. 19(A)) are patterned by YBCO film on an MgO substrate 1a having a thickness t of 0.5 mm, and the filter is sealed in an aluminum-alloy package 1d. The package 1d and upper cover 1e (see FIG. 19(B)) prevents leakage of electromagnetic field, thereby uniformly cooling substrate 1a. FIG. 19(A) is a plan view in which an upper cover 1e of the package has been removed, and FIG. 19(B) is a sectional view taken along line AA in FIG. 19(A). Further, reference characters 1f, 1g represent coaxial connectors and 1h (see FIG. 19(B)) a ground formed by YBCO film having a thickness of 0.4 μm.

The electrical connections in the vacuum vessel are as shown in FIG. 20. For example, two channels of wireless receiving amplifiers are formed. Superconducting filters 1, 1' exhibit a prescribed pass-band characteristic if they are cooled to a cryogenic temperature of 70 K, and output pass-band components from among signals contained in receive signals that enter from input terminals 7b, 7b'. Low-noise amplifiers (LNA) 2, 2' amplify the signals that have passed through the superconducting filters 1, 1', and the amplified signals are delivered from output terminals 8b, 8b'. The low-noise amplifiers 2, 2' have a gain characteristic and a noise figure characteristic shown in FIGS. 21(A) and 21(B). The solid line indicates the characteristic at ordinary temperature (=23° C.) and the dashed line the characteristic at a cryogenic temperature of 77 K. It will be understood that when a cryogenic temperature is attained, the gain rises by 2 dB and the noise figure declines. That is, it is preferred that the low-noise amplifiers 2, 2' be used at cryogenic temperatures rather than at ordinary temperature.

Thus, the superconducting filter 1 is accommodated within the vacuum vessel 3 and operates upon being cooled to cryogenic temperature of, e.g., T=70 K by the refrigerator 5. Further, if the low-noise amplifier (LNA) 2 that amplifies the received signal to a prescribed level also is cooled to a cryogenic temperature, then the noise figure can be reduced. In general, therefore, the low-noise amplifier is cooled at the same time as the superconducting filter 1. A signal received by an antenna (not shown) is input to the case 6 from the input terminal 7a via an antenna feeder, the signal propagates through the coaxial cables 9a, 9c, only a signal of the necessary frequency band is extracted by the superconducting filter 1, this signal is amplified to a prescribed signal level by the low-noise amplifier 2, and the resultant signal is output from the output terminal 8a.

In a mobile communications system, the wireless receiving amplifier shown in FIG. 18 is installed outdoors, namely on the roof of a building, and hence is placed in a hostile environment of high temperatures and humidity as occur in mid-summer, etc. While thus exposed to very harsh conditions, the wireless receiving amplifier is required to exhibit stable operating reliability for an extended period of time of, e.g., tens of thousands of hours. However, since many sliding parts are used in the refrigerator 5, mechanical malfunction is a possibility. If the refrigerator 5 malfunctions, the temperature, which is being held at, e.g., T=70 K, naturally will rise and the superconducting filter 1 will no longer perform its original function. The result is communication failure. Accordingly, if the refrigerator develops a failure, it is necessary to have a function for detecting the failure immediately and reporting the failure, or a function for detecting the failure while it is still minor and reporting the same. In the prior art, there are arrangements in which refrigerator abnormality is detected by measuring the temperature in the vacuum vessel and performing monitoring to determine whether the temperature has exceeded a set temperature. However, the apparatus involved is large in size and of great weight. This does not conform to the requirement for an apparatus of smaller size and lighter weight.

SUMMARY OF THE INVENTION

Accordingly, an object of the present invention is to provide a superconducting filter apparatus and wireless receiving amplifier in which refrigerator malfunction can be detected rapidly and reliably, and in which it is possible to achieve a reduction in size and weight.

Another object of the present invention is to provide a superconducting filter apparatus and wireless receiving amplifier in which refrigerator malfunction can be detected as well as the extent of the malfunction.

A further object of the present invention is to so arrange it that the occurrence of malfunction in either a refrigerator or low-noise amplifier or in both the refrigerator and amplifier can be detected reliably.

A superconducting filter apparatus according to the present invention comprises a superconducting filter that exhibits a prescribed pass-band characteristic when cooled to cryogenic temperatures; a refrigerator for cooling the superconducting filter to cryogenic temperatures; a pilot signal generator for generating a pilot signal that is outside the pass band and inputting the pilot signal to the superconducting filter together with an antenna receive signal; and a discriminating unit for discriminating abnormality in the refrigerator based upon the level of a pilot signal contained in a signal that is output from the superconducting filter. If the refrigerator develops a malfunction and temperature rises, the pass band of the superconducting filter shifts to the low-frequency side, the frequency of the pilot signal falls within the pass band of the superconducting filter and the pilot signal passes through the superconducting filter. Accordingly, refrigerator abnormality can be detected by monitoring whether the pilot signal is contained in the signal that is output from the superconducting filter. The following effects can be expected in accordance with the present invention:

(1) Refrigerator malfunction can be detected rapidly and, moreover, the superconducting filter apparatus can be reduced in size and weight.

(2) By providing the pilot signal generator in the vicinity of the receive antenna, e.g., by providing a pilot-signal radiating antenna in the vicinity of the receive antenna, the pilot signal can be inserted into the receive signal and input to the superconducting filter without loss.

(3) By inserting an isolator into an antenna feeder line, it can be so arranged that the pilot signal will not be radiated into space from the antenna even if it is reflected by the superconducting filter. As a result, it can be so arranged that the pilot signal will not become interference with regard to other communication channels.

(4) The level of the pilot signal contained in the signal that is output from the superconducting filter can be detected and the extent of a malfunction can be determined based upon the waveform of the detected level, e.g., the rate of change in the level.

(5) Pilot signals of two waves having different frequencies are generated and input to the superconducting filter, the discriminating unit detects the level of each pilot signal and the extent of a malfunction can be determined based upon the waveforms of the detected levels.

(6) It is possible to construct a wireless receiving amplifier by connecting a low-noise amplifier to the superconducting filter and cooling both the superconducting filter and low-noise amplifier to cryogenic temperatures, thereby amplifying and outputting the signal, which passes through the superconducting filter, by the low-noise amplifier.

A wireless receiving apparatus according to the present inventionincludes: a superconducting filter that exhibits a prescribed pass-band characteristic when cooled to cryogenic temperatures; a low-noise amplifier for amplifying a signal that is output from the superconducting filter; a refrigerator for cooling the superconducting filter and the low-noise amplifier to cryogenic temperatures; pilot signal applying means for applying a pilot signal that is outside the pass band to a portion intermediate the superconducting filter and low-noise amplifier; and a discriminating unit for detecting a decline in the level of the pilot signal contained in a signal that is output from low-noise amplifier, deciding that the refrigerator is abnormal when the level of the pilot signal falls to a set level, and deciding that the low-noise amplifier is abnormal when the level of the pilot signal falls to a level other than the set level.

If the refrigerator (superconducting filter) and low-noise amplifier are both normal, half of the power of the pilot signal applied by the pilot signal applying means advances in the direction of the superconducting filter and the portion of the pilot signal that corresponds to the other half of the power advances in the direction of the low-noise amplifier. If the superconducting filter operates normally, the pilot signal is totally reflected and looped back in the direction of the low-noise amplifier so that the total power of the pilot signal is input to the low-noise amplifier as a result. If the temperature rises due to refrigerator malfunction, on the other hand, the pilot signal is absorbed by the superconducting filter and is converted to heat in its entirety. Hence the power that enters the low-noise amplifier is halved. Accordingly, the level of the pilot signal contained in the signal output from the low-noise amplifier when the refrigerator is normal differs from that when the refrigerator is abnormal. When a malfunction occurs, there is a prescribed level drop in comparison with the time of normal operation. Thus, a drop in the level of the pilot signal contained in the signal output from the low-noise amplifier is monitored, the refrigerator is judged to be abnormal when the level of the pilot signal falls to a prescribed level, and the low-noise amplifier is judged to be abnormal when the level of the pilot signal falls to a level other than the prescribed level.

Further, a separate pilot signal is input to the superconducting filter and refrigerator abnormality is detected based upon the detected level of the pilot contained in the signal output from the low-noise amplifier. If this arrangement is adopted, refrigerator malfunction can be detected reliably and, moreover, it is possible to reliably discriminate abnormality of the low-noise amplifier based upon a drop in the reception level of the pilot signal applied to the portion intermediate the superconducting filter and low-noise amplifier.

BRIEF DESCRIPTION OF THE DRAWINGS

FIGS. 3(A), 3(B) and 3(C) are diagrams useful in describing temperature dependence of the pass band characteristic and loss characteristic of the superconducting filter;

FIGS. 10(A), 10(B) and 10(C) show time waveforms of detected level in a case where the extent of refrigerator malfunction is detected using pilot signals of two waves;

FIGS. 14(A) and 14(B) are diagrams useful in describing the principle of fault-location detection according to a fifth embodiment;

FIG. 20 is a diagram showing the conventional electrical connections in a vacuum vessel; and FIGS. 21(A) and 21(B) show a gain characteristic and noise figure characteristic of the conventional low-noise amplifier.

DESCRIPTION OF THE PREFERRED EMBODIMENTS

(A) First Embodiment (a) Overall Configuration

Figure 1:
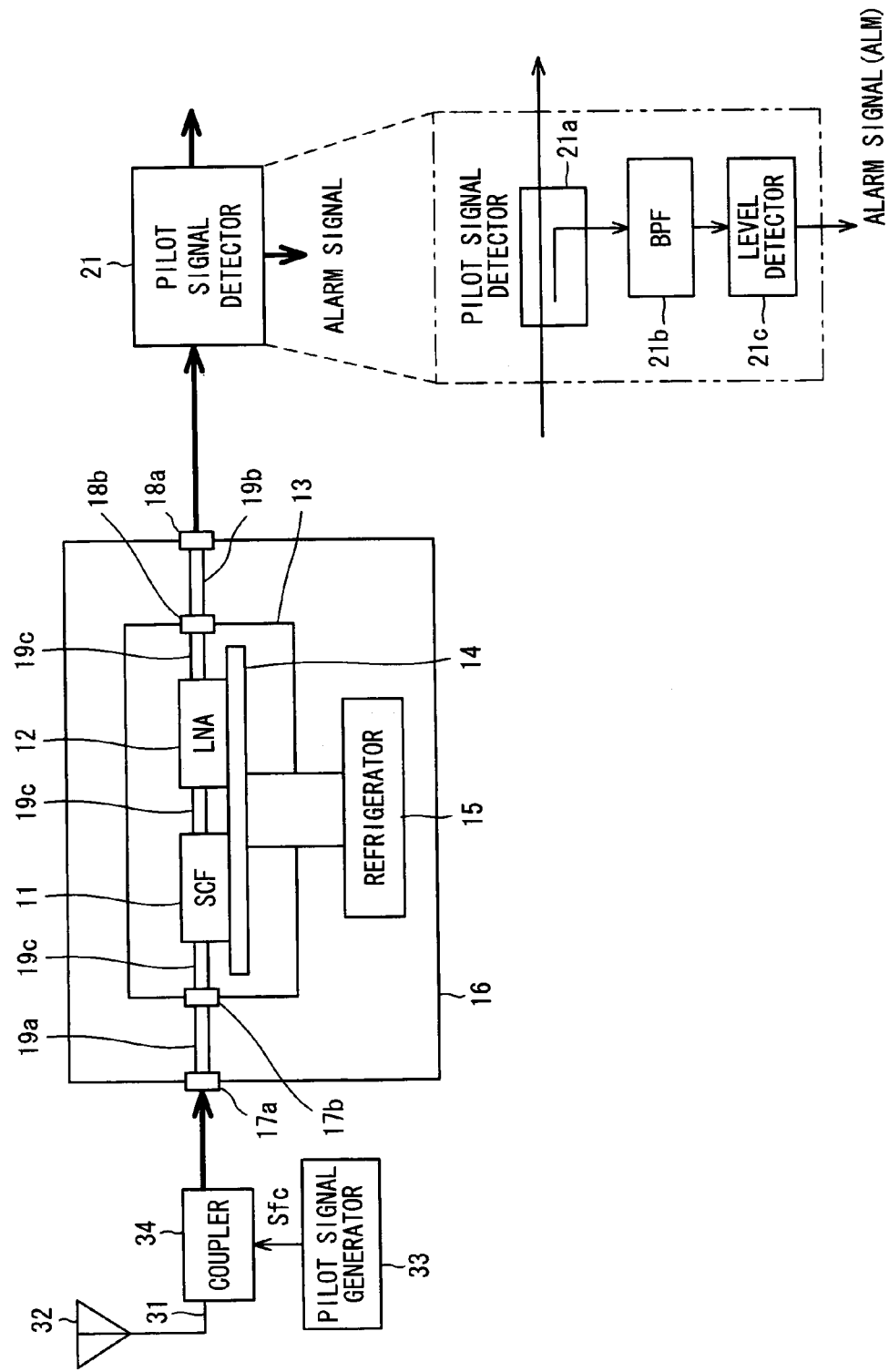
FIG. 1 is a diagram illustrating the structure of a wireless receiving amplifier according to the present invention.

FIG. 1 is a diagram showing the structure of a wireless receiving amplifier according to the present invention. A superconducting filter (SCF) 11 and low-noise amplifier (LNA) 12 are secured to a cold head 14 and accommodated within a vacuum vessel 13. The cold head 14 is cooled by a refrigerator 15. The superconducting filter 11 and low-noise amplifier 12 are cooled by the refrigerator 15 via the cold head 14 and operate at Tc=70 K. The vacuum vessel 13 and refrigerator 15 are disposed in a case 16 in such a manner that outdoor installation is possible. Terminals 17a, 17b and 18a, 18b provided on the case 16 and vacuum vessel 13 are connected by coaxial cables 19a, 19b, respectively, and terminal 17b, superconducting filter 11, low-noise amplifier 12 and terminal 18b are connected by a coaxial cable 19c.

A receive antenna 32 is connected to input terminal 17a of the case 16 via an antenna feeder 31, and a signal that has been received from the antenna is input to the superconducting filter 11 via the input terminal 17a. A pilot signal generator 33 generates a pilot signal, and the pilot signal is superimposed upon the antenna receive signal via a signal coupler 34. Accordingly, the pilot signal is input to the superconducting filter together with the antenna receive signal. Frequency $f_c$ of the pilot signal is a frequency that is outside the pass frequency of the superconducting filter 11 at 70 K.

A pilot signal detector 21 is connected to output terminal 18a of the case 16, whether the signal output from the low-noise amplifier 12 contains the pilot signal is monitored and the level thereof is detected. The pilot signal detector 21 has a directional coupler 21a in which the part of the input signal is loaded, a bandpass filter (BPF) 21b having a center frequency for passing the pilot signal, and a level detector 21c for detecting the level of the pilot signal based upon the output of the bandpass filter.

(b) Principle of the Present Invention

Figure 2:
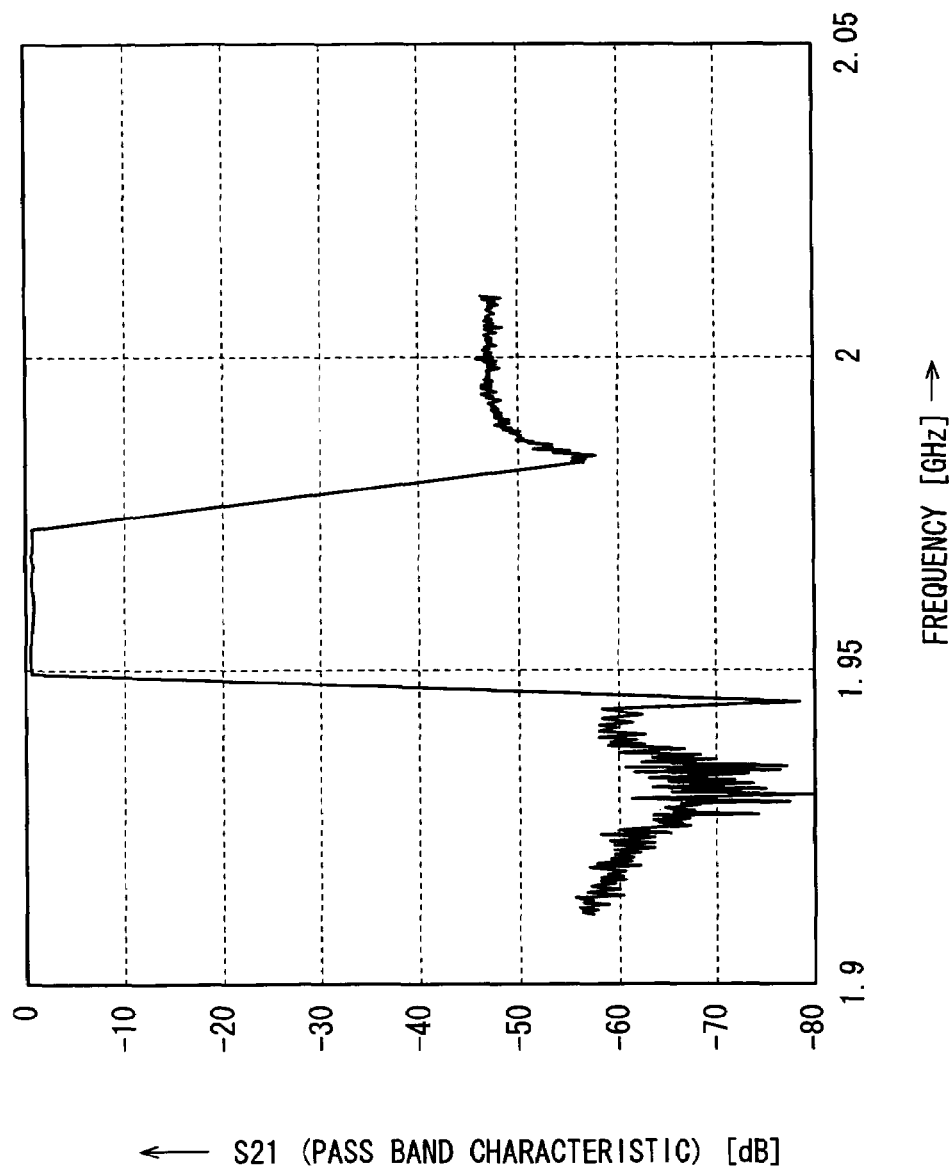
FIG. 2 is a pass band characteristic of a superconducting filter.

The superconducting filer 11 exhibits a prescribed pass band characteristic S21 when it is cooled to a cryogenic temperature of 70 K FIG. 2 shows an example of the pass band characteristic of the superconducting filter 11 at $T_0$=70 K. The superconducting filter has a pass band of 1950 to 1970 MHz. The superconducting filter 11 operates below the critical temperature ($T_c$). If the temperature is raised as follows: $T=T_0 \rightarrow T_1 \rightarrow T_2$ ($T_0<T_1<T_2$), as shown in FIG. 3(A), the center frequency $f_0$ of the filter pass band diminishes as follows: $f_{00} \rightarrow f_{01} \rightarrow f_{02}$, and insertion loss increases. The closer the temperature approaches the critical temperature $T_c$, the greater the rate of change. As a result, the pass band characteristic S21 of the superconducting filter 11 varies depending upon temperature ($T=T_0$, $T=T_1$, and $T=T_2$), as shown in FIG. 3(B). In actuality, since the low-noise amplifier 12 is connected immediately following the superconducting filter 11, the overall pass band characteristic varies depending upon temperature ($T=T_0$, $T=T_1$, and $T=T_2$), as shown in FIG. 3(C), as a result of the signal being amplified by the gain of the low-noise amplifier 12. In FIGS. 3(B) and 3(C), $f_{00}$, $f_{01}$ and $f_{02}$ are center frequencies of the pass band characteristics S21 at the temperature ($T=T_0$, $T–T_1$, and $T–T_2$).

Accordingly, a pilot signal having a frequency $f_c$ outside the filter pass band at $T=T_0$ (=70 K) is input to the superconducting filter 11. However, the frequency $f_c$ of the pilot signal is set so as to be lower than the pass-band frequency. Thus, at $T=T_0$, the pilot signal frequency $f_c$ is outside the pass band of the superconducting filter 11 and therefore the pilot signal Sfc is reflected by the filter portion and does not enter the low-noise amplifier 12.

If the temperature T rises due to failure of the refrigerator 15, however, the pass band of the superconducting filter 11 begins to shift to the low-frequency side, a shown in FIG. 3(C), and the pilot frequency $f_c$ gradually falls within the pass band of the filter 11. As a result, the pilot signal Sfc begins to pass through the filter 11 (time $t=t_1$). As the temperature rises further, the amount of the pilot signal passed gradually increases until the pilot frequency $f_c$ falls entirely within the pass band of the superconducting filter 11 ($t=t_2$). If the pilot frequency $f_c$ falls completely within the pass band, the amount of the pilot signal passed becomes substantially constant. If the temperature rises further and the pilot frequency $f_c$ begins to fall within the attenuation region of the superconducting filter ($t=t_3$), the amount of the pilot signal passed gradually decreases. When the pilot frequency $f_c$ eventually falls outside the pass band ($t=t_4$), the amount of the signal passed becomes zero. As a result, the level of the pilot signal that enters the pilot signal detector 21 takes on a waveform of the kind shown in FIG. 4 with the passage of time.

Thus, if a threshold level $L_{TH}$ is decided and this level is exceeded, then the pilot signal detector 21 decides that the frequency characteristic (pass band characteristic) of the superconducting filter 11 has changed. In other words, if the detected level exceeds the threshold level $L_{TH}$, the pilot signal detector 21 decides that the refrigerator 15 has malfunctioned, thereby allowing a rise in temperature, and outputs an alarm signal ALM as shown in FIG. 1.

(C) Detection of Refrigerator Malfunction

The superconducting filter 11 and low-noise amplifier 12 are secured to the cold head 14 and held in vacuum within the vacuum vessel 13 so as to be shielded against atmospheric temperature. The superconducting filter 11 is obtained by, e.g., forming a filter pattern having a pass band region of 1920 to 1940 MHz on a magnesium oxide (MgO) substrate and consists of nine stages of a YBCO superconductor for which $T_c$=90 K holds. The superconducting filter 11 is accommodated in a metal package having a size on the order of 50×50×15 mm and is uniformly cooled. At an operating temperature $T_0$=70 K, loss of less than 0.1 dB in the pass band region can be achieved. The refrigerator 15 is supplied with power from the outside and is driven and controlled by a driving power supply and temperature regulator (not shown) in such a manner that a filter operating temperature of 70 K will be obtained. This equipment is accommodated in the case 16 having a size on the order of 500×500×300, and the case is installed outdoors, as on the roof of a building. Consequently, the internal temperature can rise to 60 to 80 degrees, as on a summer afternoon. It is required that the refrigerator 15 operate stably for an extended period of time even when subjected to harsh conditions.

The signal that has been received from the antenna enters from the input terminal 17a, only a signal of the desired frequency band passes through the superconducting filter 11, the passed signal is amplified by the low-noise amplifier 12, and the amplified signal is output from the output terminal 18a and sent to the next stage via the pilot signal detector 21. Accordingly, if a pilot signal outside the filter band (e.g., pilot frequency $f_c$=1900 MHz) is impressed upon the receive signal and the resultant signal is input to the input terminal 17a, then the pilot frequency $f_c$ will be outside the pass band of the filter in the case of normal operation (T=$T_0$) and, hence, the signal will be reflected by the filter portion. As a result, the pilot signal Sfc will not enter the low-noise amplifier 12 and will not be contained in the output signal of the low-noise amplifier.

Figure 4:
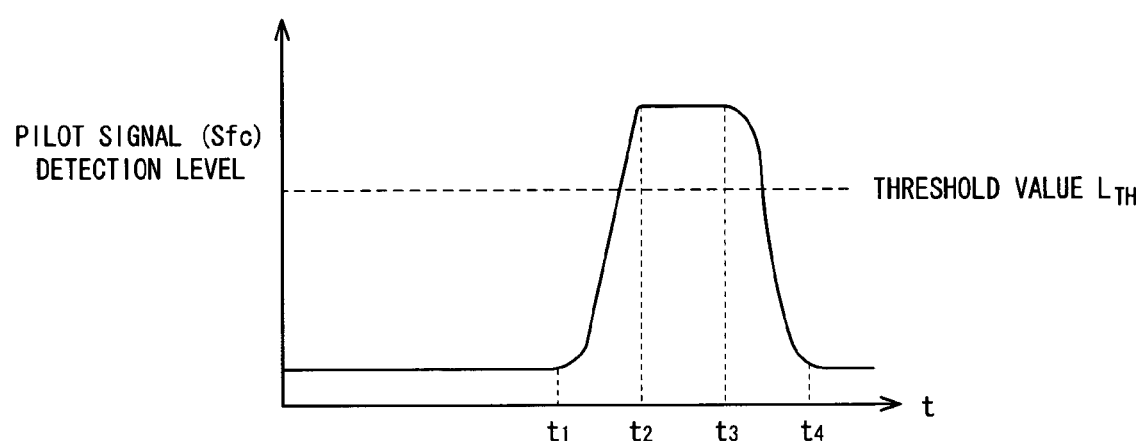
FIG. 4 is a time waveform diagram of pilot detected level at the time of a rise in temperature.

However, if the refrigerator 15 malfunctions and the temperature of the superconducting filter portion rises, the frequency characteristic begins to shift to the low-frequency side and the pilot signal begins to pass through the superconducting filter 11. The pilot signal that has passed through the filter is amplified by the low-noise amplifier 12 and the amplified signal is sent to the pilot signal detector 21. The latter extracts only the pilot-signal component and samples the level of the pilot signal at fixed time intervals. If the refrigerator 15 malfunctions, a time waveform of the detected level shown in FIG. 4 is obtained. If the detected level exceeds the threshold value, therefore, the pilot signal detector 21 outputs the alarm signal ALM, which indicates refrigerator malfunction.

Figure 5:
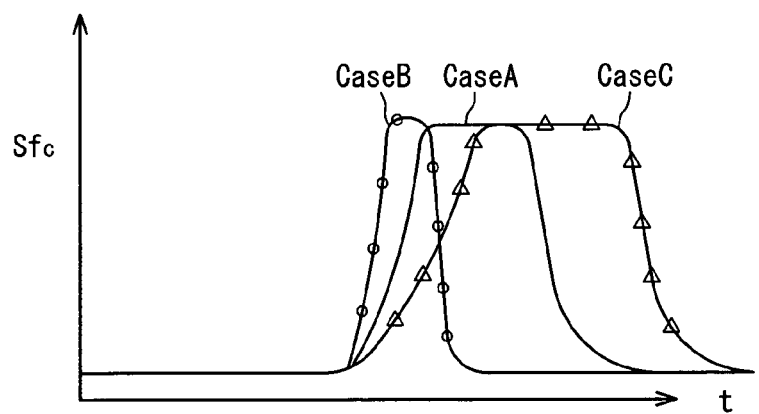
FIG. 5 is a diagram useful in describing the relationship between extent of refrigerator malfunction and the time waveform of the pilot detected level.

Thus, as set forth above, the pilot signal detector 21 samples and records the detected level of the pilot signal at fixed intervals $t_1$, $t_2$, $t_3$ and $t_4$ (see FIG. 4). The rate of change of the detected level at the times of the rise and fall of the time waveform and the length of time the threshold level $L_{TH}$ is exceeded differ in dependence upon rate of temperature rise. That is, in the event of a serious refrigerator malfunction, the rate of the rise in temperature increases, the rising edge and falling edge of the detected-level time waveform become steep, as indicated by Case B in FIG. 5, and the length of time the threshold level $L_{TH}$ is exceeded diminishes. On the other hand, in the case of a minor refrigerator malfunction, the rate of the rise in temperature decreases, the rising edge and falling edge of the detected-level time waveform become less steep, as indicated by Case C in FIG. 5, and the length of time the threshold level $L_{TH}$ is exceeded increases. In the case of moderate refrigerator malfunction, the slope of the rising edge and falling edge of the detected-level time waveform and the length of time the threshold level $L_{TH}$ is exceeded become intermediate as in Cases B and C, as indicated by Case A in FIG. 5. Thus, if a mechanism that identifies the waveforms of Cases A to C is mounted on the pilot signal detector 21, the extent of the refrigerator malfunction can be ascertained. In other words, the extent of a failure can be classified as follows: Case B=serious, Case C=minor, Case A=average, and an order of priority regarding the dispatch of a serviceman can be assigned in accordance with the extent of failure. This is useful in terms of providing specific feedback for troubleshooting.

(B) Second Embodiment

Figure 6:
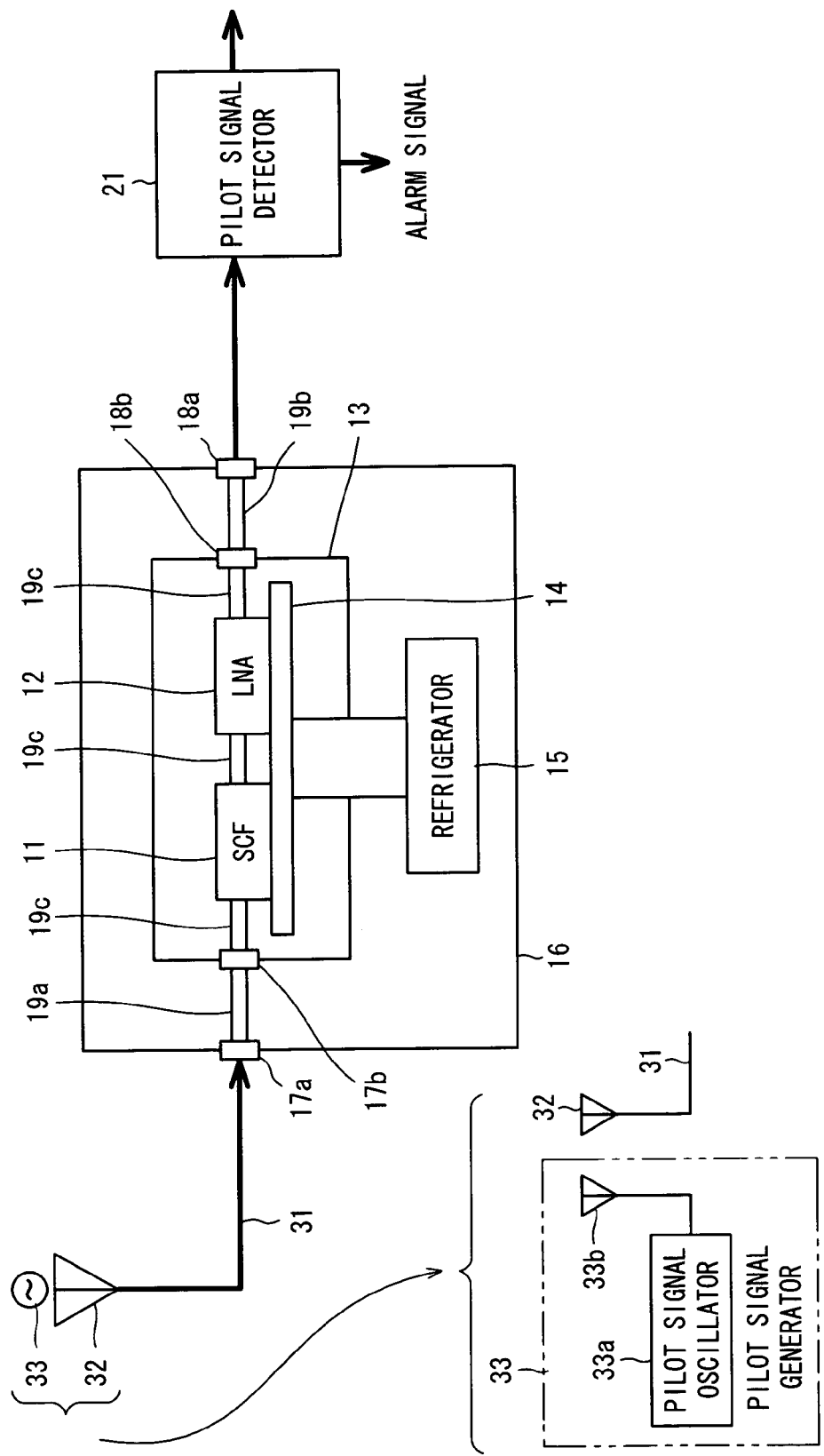
FIG. 6 is a diagram showing the structure of a second embodiment of the present invention.

FIG. 6 is a diagram showing the structure of a second embodiment of the present invention. This embodiment has a preferable arrangement for inserting a pilot signal into the signal received by the antenna. Components identical with those of the first embodiment in FIG. 1 are designated by like reference characters.

The pilot signal can be impressed upon the antenna receive signal using a coupler or the like, as in the first embodiment. However, loss at the output stage of the low-noise amplifier 12 increases, the noise figure (NF) increases and the advantage of cooling the low-noise amplifier 12 cannot be fully exploited. Accordingly, the pilot signal generator 33 is placed in the vicinity of the receive antenna 32, as shown in FIG. 6. The pilot signal generator 33 has an oscillator 33a for generating a pilot signal having the frequency $f_c$ outside the pass band of the superconducting filter 11, and a directional antenna 33b for radiating the pilot signal toward the receive antenna 32. The antenna 33b therefore is pointed toward the receive antenna 32 and is placed in the vicinity thereof. If the oscillator 33a is caused to oscillate under these conditions, the pilot signal is radiated toward the receive antenna 32, and the receive antenna 32 receives the pilot signal from a mobile station and inputs the pilot signal to the signal input terminal 17a via the antenna feeder 31. As a result, the pilot signal can be superimposed upon the receive signal from the mobile station without the inclusion of needless loss, as in the case of the coupler, and the resultant signal is input to the input terminal 17a. Thus, an abnormality in the refrigerator can be detected without increasing the noise figure (NF).

(C) Third Embodiment

Figure 7:
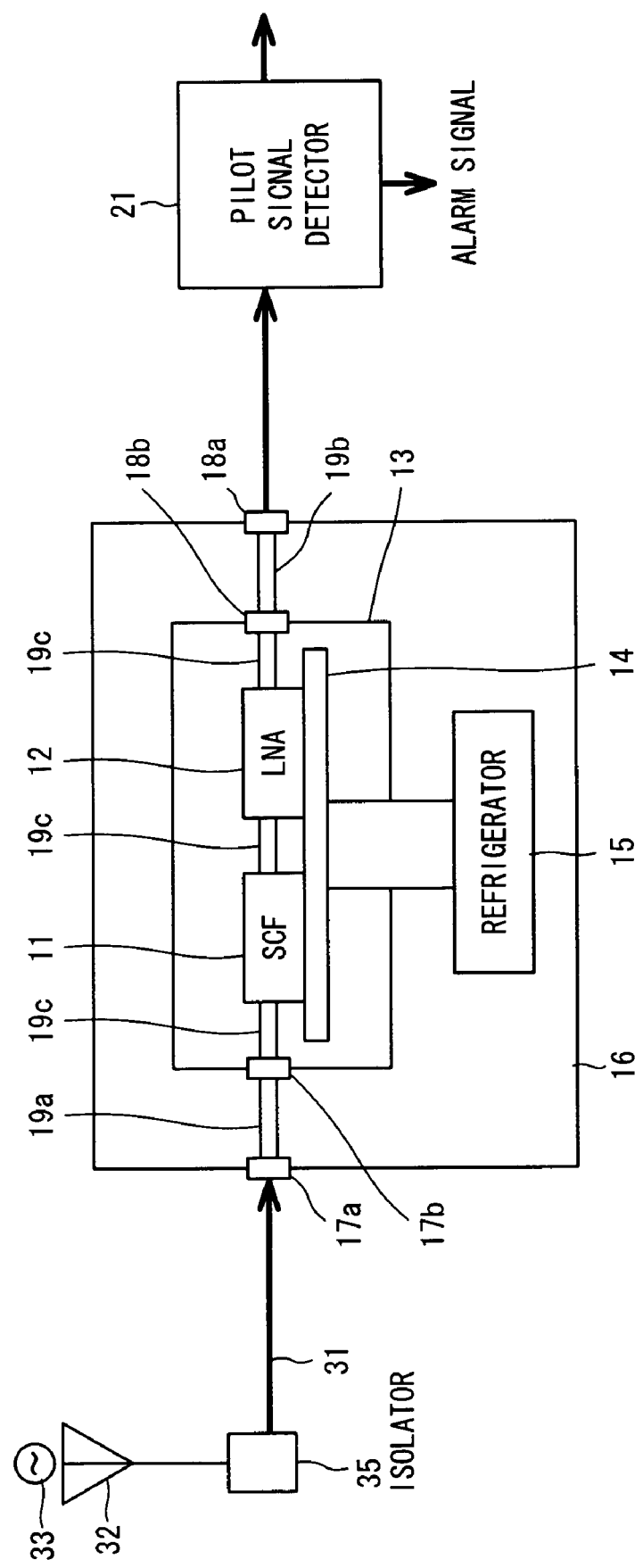
FIG. 7 is a diagram showing the structure of a third embodiment of the present invention.

FIG. 7 is a diagram showing the structure of a third embodiment of the present invention. This arrangement is the same as that of the second embodiment in FIG. 6 except for the fact that an isolator 35 is provided between the receive antenna 32 and the input terminal 17a of the case 16. Identical components are designated by like reference characters.

In a case where the refrigerator 15 is operating normally, the pilot signal outside the pass band of the superconducting filter 11 is almost totally reflected by the filter portion and the reflected pilot signal radiates from the antenna 32. In a case where the antenna 32 possesses directivity and has gain, the reflected signal is radiated with a higher signal level at this time and may constitute interference with respect to other communication channels. Accordingly, in the third embodiment, the isolator 35 is inserted into the antenna feeder 31 to isolate the pilot signal that is reflected from the superconducting filter 1. In accordance with the third embodiment, a reflected pilot signal will not be radiated from the antenna and will not have an adverse effect upon other communication channels.

(D) Fourth Embodiment

Figure 8:
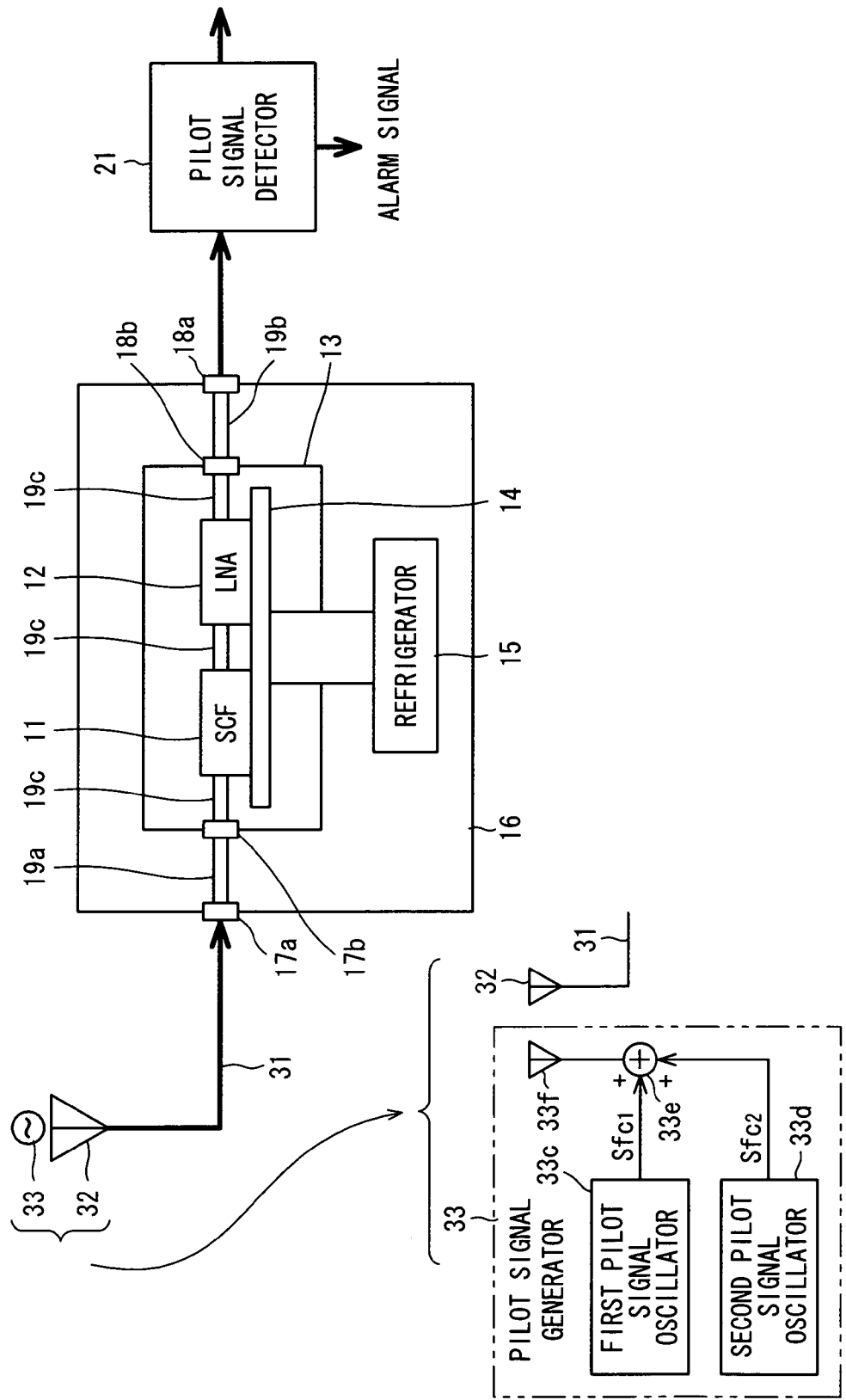
FIG. 8 is a diagram showing the structure of a fourth embodiment of the present invention.

FIG. 8 is a diagram showing the structure of a fourth embodiment of the present invention. This embodiment has an arrangement for inserting first and second pilot signals into the signal received by the antenna. Components identical with those of the second embodiment in FIG. 6 are designated by like reference characters. The pilot signal generator 33 disposed in the proximity of the receive antenna 32 has an oscillator 33c for generating a first pilot signal $Sfc_1$ of frequency $fc_1$, an oscillator 33d for generating a second pilot signal $Sfc_2$ of frequency $fc_2$ ($>fc_1$), a combiner 33e for combining the first and second pilot signals $Sfc_1$, $Sfc_2$, and an antenna 33f for radiating the first and second pilot signals toward the receive antenna 32.

If the refrigerating capability of the refrigerator declines due to prolonged use (minor malfunction), the operating temperature of the superconducting filter 11 will rise above $T_0$ (=70 K) due to a rise in the ambient temperature of the refrigerator. However, if night falls and the ambient temperature of the refrigerator falls to room temperature, the operating temperature of the superconducting filter 11 will return to $T_0$ and the filter will operate normally. In the case of a serious malfunction, on the other hand, the operating temperature of the superconducting filter 11 rises above and stays above $T_0$ (=70 K) and the superconducting filter 11 can no longer operate normally. If the extent of such a malfunction can be detected, then it will be possible to take measures that conform to the extent of the malfunction.

Figure 9:
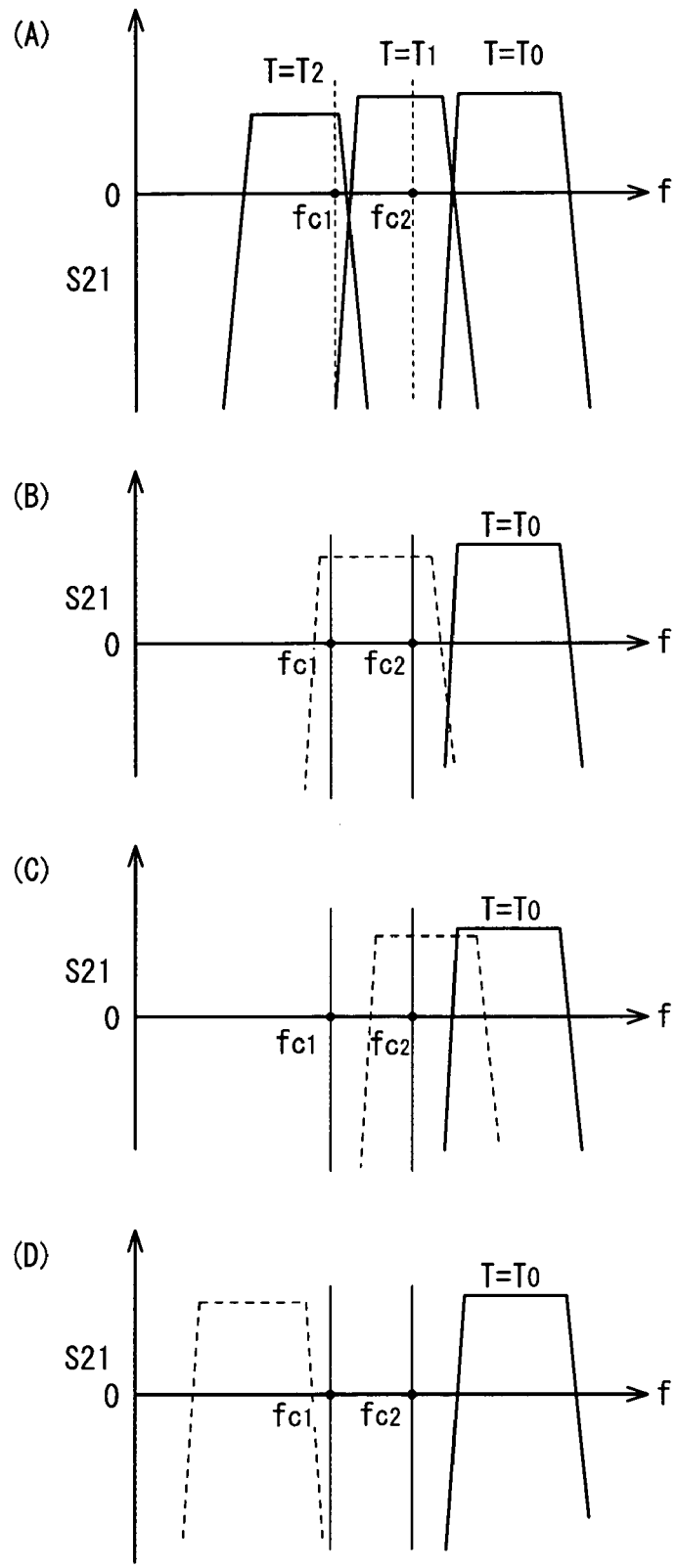
FIGS. 9(A), 9(B), 9(C) and 9(D) are diagrams useful in describing a pass band characteristic in a case where the extent of refrigerator malfunction is detected using pilot signals of two waves.

Accordingly, as shown in FIG. 9(A), the two pilot signals $Sfc_1$, $Sfc_2$ of the frequencies $fc_1$, $fc_2$, respectively, that are outside the pass band of the superconducting filter 11 for which $T=T_0$ holds are input to the superconducting filter 11 together with the receive signal, and the levels of the pilot signals $Sfc_1$, $Sfc_2$ are detected by the pilot signal detector 21 to discriminate the extent of refrigerator malfunction. In FIG. 9(A), each of the pass band characteristic at the temperature of T=T0, T=T1 and T=T2, is shown and in FIGS. 9(B), 9(C) and 9(D), a pass band characteristic at the temperature of T=T0 is shown.

FIGS. 10(A), 10(B), and 10C) show pilot signals $Sfc_1$ of frequency $fc_1$ and $Sfc_2$ of frequency $fc_2$ relative to time. If the refrigerator malfunction is minor, as when there is a temporary decline in refrigerating performance, the pass band characteristic (frequency characteristic) of the superconducting filter 11 shifts temporarily to the low-frequency side due to the temperature rise. Since the temperature returns to normal, however, the pass band characteristic also returns to normal. In other words, due to a temporary rise in temperature, the pass band characteristic of the superconducting filter 11 is as indicated by the dashed line in FIG. 9(B). Thereafter, the characteristic returns to the pass band characteristic of the solid line due to the return to normal temperature. When the temperature rises, therefore, first the pilot signal $Sfc_2$ of frequency $fc_2$ is detected, as shown in FIGS. 9(B) and 10(A), and then the pilot signal $Sfc_1$ of frequency $fc_1$ is detected. When the temperature returns to normal, on the other hand, first the pilot signal $Sfc_1$ of frequency $fc_1$ stops being detected, then the pilot signal $Sfc_2$ of frequency $fc_2$ stops being detected. If the temperature rise is slight, the pass band characteristic of the superconducting filter 11 becomes as indicated by the dashed line in FIG. 9(C), the pilot signal $Sf_1$ of frequency $fc_1$ is not detected and only the pilot signal $Sfc_2$ is detected. The time waveform of the detected level of the pilot signal $Sfc_2$ becomes as shown in FIG. 10(B).

If the malfunction is serious, on the other hand, the pass band characteristic (frequency characteristic) of the superconducting filter 11 becomes as indicated by the dashed line in FIG. 9(D) due to a rise in temperature and, hence, frequency shifts to the low-frequency side from the frequencies $fc_1$, $fc_2$ and remains there. When the temperature rises, therefore, first the pilot signal $Sfc_2$ of frequency $fc_2$ is detected, as shown in FIG. 10(C), then the pilot signal $Sfc_1$ of frequency $fc_1$ is detected. As the temperature rises further, first the pilot signal $Sfc_2$ of frequency $fc_2$ stops being detected, then the pilot signal $Sfc_1$ of frequency $fc_1$ stops being detected.

The pilot signal detector 21 extracts the components of the pilot signals $Sfc_1$, $Sfc_2$, samples the levels of each of the pilot signals at fixed time intervals and detects the extent of the malfunction based upon the time waveform of the detected level of each pilot signal. If this arrangement is adopted, an order of priority regarding the dispatch of a serviceman can be assigned in accordance with the extent of failure. This is useful in terms of providing specific feedback for troubleshooting.

(E) Fifth Embodiment

Figure 11:
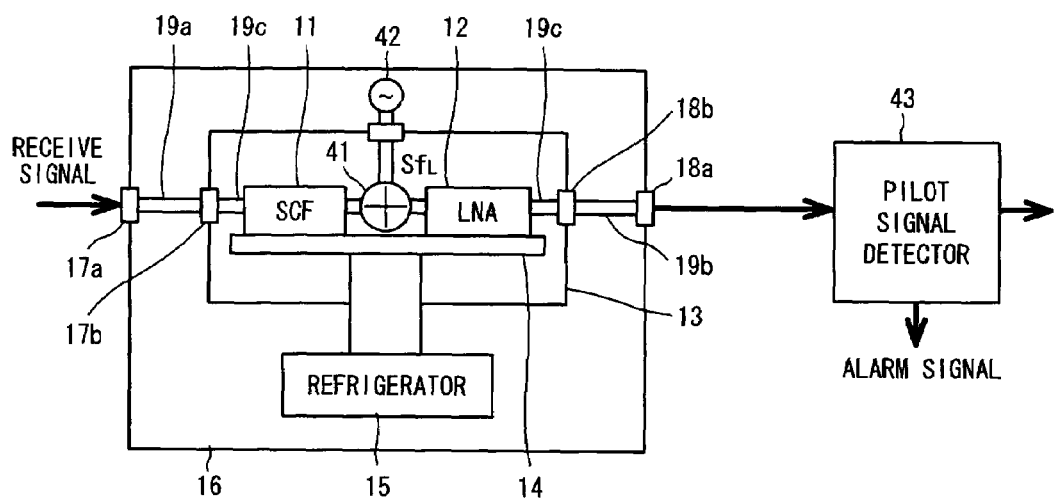
FIG. 11 is a diagram showing the structure of a fifth embodiment of the present invention.
Figure 12:
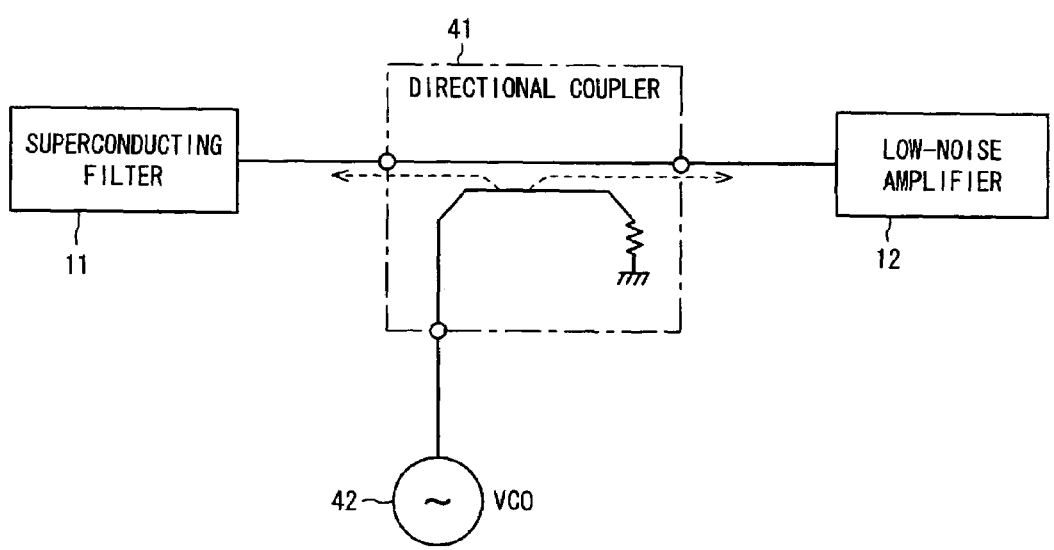
FIG. 12 is a diagram useful in describing the structure and operation of a directional coupler.

FIG. 11 is a diagram showing the structure of a fifth embodiment of the present invention. This embodiment detects refrigerator malfunction and malfunction of the low-noise amplifier. Components identical with those of the first embodiment in FIG. 1 are designated by like reference characters. In the fifth embodiment, a directional coupler 41 is provided intermediate the superconducting filter 11 and low-noise amplifier 12, and the pilot signal that is output from a pilot signal generator 42 is superimposed upon the output signal of the superconducting filter 11 via this directional coupler. The frequency $f_L$ of the pilot signal is outside the pass band of the superconducting filter 11. By way of example, $f_L$=2000 MHz holds. The directional coupler 41 which has the structure shown in FIG. 12, which shows pilot signals Sfc1 of frequency fc1 and Sfc2 of frequency fc2 relative to time in FIG. 11, couples the pilot signal, which is output from the pilot signal generator (oscillator VCO) 42, in such a manner that the signal flows in the direction of the superconducting filter 11 and in the direction of the low-noise amplifier 12.

When operation is normal, an applied pilot signal $Sf_L$ is amplified by the low-noise amplifier 12 and the amplified signal is output from the output terminal 18a together with the antenna receive signal. A pilot signal detector 43 detects the level of the pilot signal and checks the low-noise amplifier 12 for abnormality based upon the level of the pilot signal. That is, since the detected level of the pilot signal $Sf_L$ falls if the low-noise amplifier 12 malfunctions, the pilot signal detector 43 checks the low-noise amplifier for abnormality based upon the level of the pilot signal.

Figure 13:
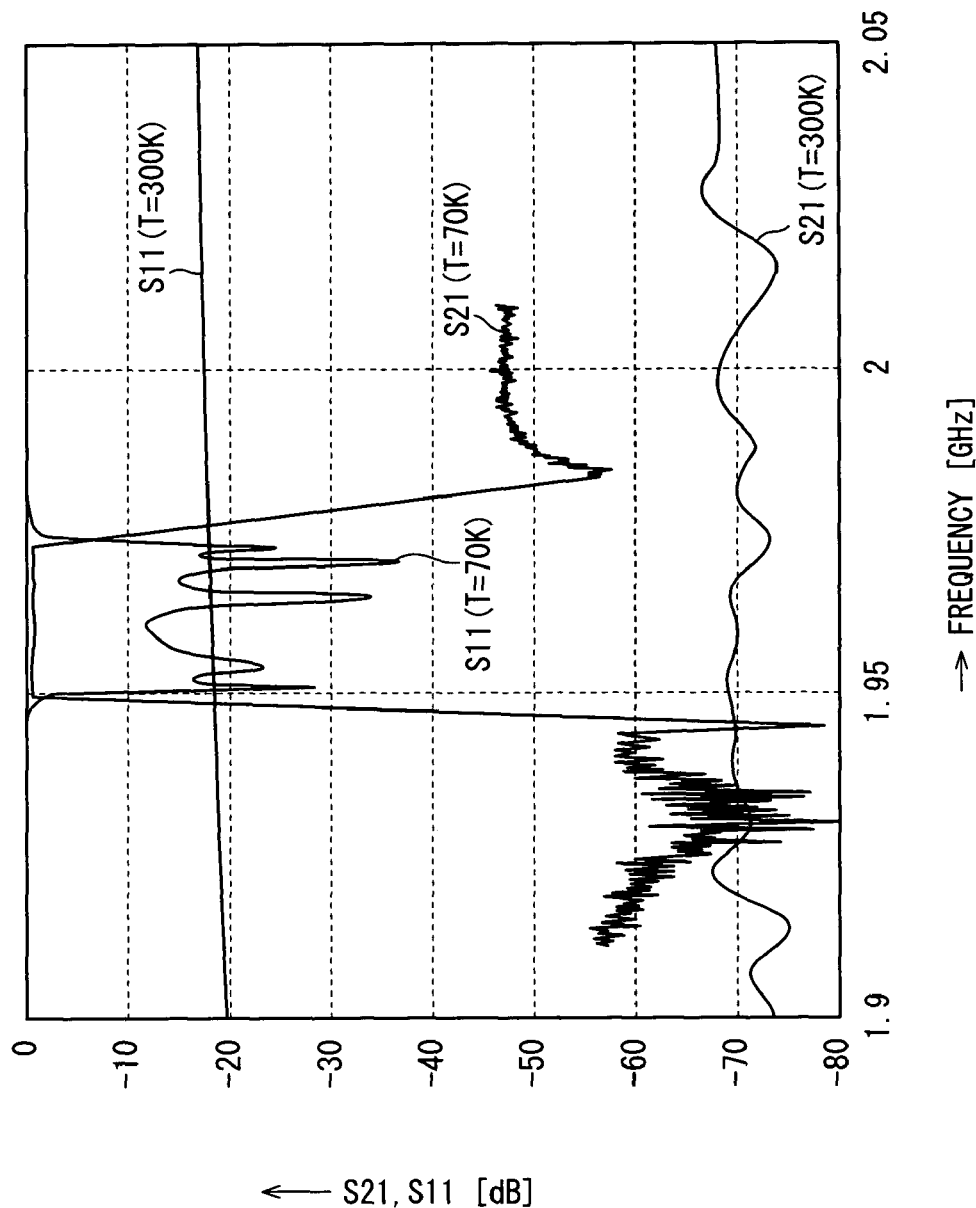
FIG. 13 is a diagram useful in describing a pass band characteristic S21/reflection characteristic S11 of a superconducting filter at cryogenic temperatures and at high temperature.

If the superconducting filter 11 is operating normally when a pilot signal outside the pass band is input to the superconducting filter 11, the pilot signal is totally reflected by the superconducting filter 11, as illustrated in FIG. 14(A), since return loss (see S11 (T=70 K)) is approximately 0 dB, as shown in FIG. 13. However, if the refrigerator malfunctions, the temperature exceeds the critical temperature and the superconducting state can no longer be achieved, the return cross (see S11 (T=300 K)) becomes −10 dB to −20 dB. As a result, the pilot signal is reflected only by 10% to 1% by the superconducting filter 11, as shown in FIG. 14(B), and the remaining 90% to 99% of the signal is absorbed within the superconducting filter and converted to heat. In FIG. 13, S21 (T=70K) show pass band characteristic S21 at the temperature of 70K and S21 (T=300K) shows pass band characteristic S21 at the temperature of 300K.

FIGS. 14(A) and 14(B) each show a superconducting filter 11, coupler 41, low-noise amplifier 12, and pilot signal generator VCO 42. Thus, if the superconducting filter 11 is operating normally (see FIG. 14(A)), pilot signal from the pilot signal generator (T=VCO) 42 is totally reflected, even though it attempts to flow into the superconducting filter 11 from the coupler 41, and signal flows to the side of the low-noise amplifier 12 and the total power of the pilot signal flows into the low-noise amplifier 12, as shown in FIG. 14(A). If the refrigerator 15 malfunctions and the critical temperature is exceeded (see FIG. 14(B)), however, the pilot signal from the pilot signal generator VCO 42 is not reflected and flows into the superconducting filter 11. As a consequence, the power of the pilot signal that flows into the low-noise amplifier 12 becomes half of that at the time of normal operation. That is, since the pilot signal flows into the superconducting filter 11 and low-noise amplifier 12 by being split equally by the coupler 41, the detected level of the pilot signal in the pilot signal detector 43 falls by 3 dB at the time of malfunction. It should be noted that since the gain of the low-noise amplifier 12 also declines when temperature rises, in actuality the level falls by 5 dB inclusive of the fall in gain. Since the fall in level is a known value due to the characteristics of the coupler and low-noise amplifier, this will be referred to as $L_D$ (dB) below.

The pilot signal detector 43 constantly determines whether the level of the pilot signal has fallen by $L_D$ (dB). For example, if the level falls by $L_D$ (dB), the pilot signal detector 43 outputs the alarm signal ALM on the grounds that the refrigerator 15 has malfunctioned. If a fall in level in excess of $L_D$ (dB) occurs, the pilot signal detector 43 outputs the alarm signal on the grounds that the low-noise amplifier 12 has malfunctioned.

(F) Sixth Embodiment

Figures 15, 16:
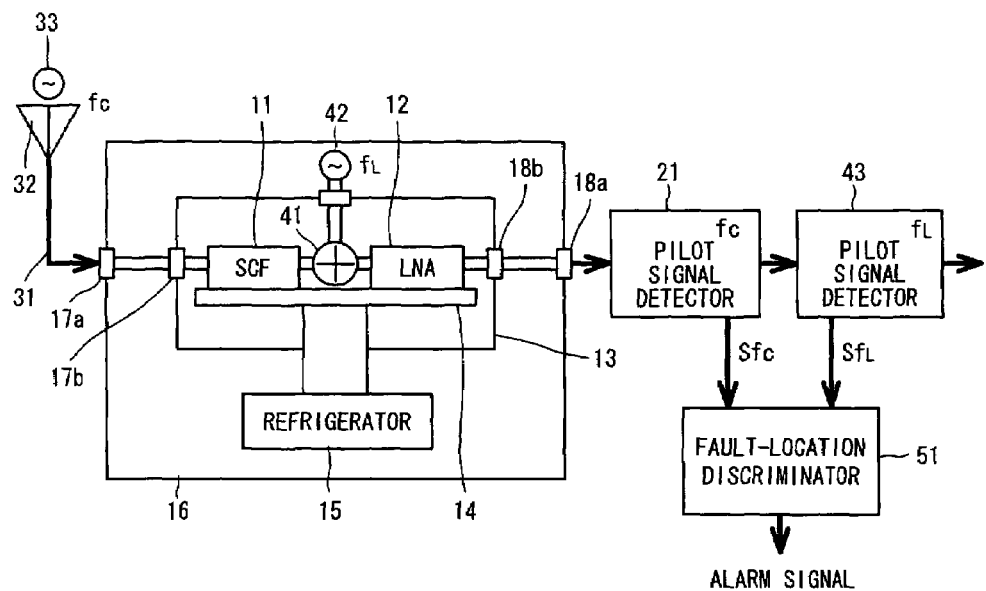
FIG. 15 is a diagram showing the structure of a sixth embodiment of the present invention.
FIG. 16 is a table useful in describing correspondence between pilot detection levels and fault locations.

FIG. 15 is a diagram illustrating the structure of a sixth embodiment of the present invention. This embodiment is obtained by combining the second and fifth embodiments to make it possible to detect refrigerator malfunction and malfunction of the low-noise amplifier in a highly precise manner. Components identical with those of the second and fifth embodiments are designated by like reference characters. As pilot signals, the sixth embodiment uses the pilot signal $Sf_c$ of frequency $f_c$ (=1900 MHz), which is for detecting refrigerator malfunction, generated by the pilot signal generator 33, and the pilot signal $Sf_L$ of frequency $f_L$ (=2000 MHz), which is for detecting malfunction of the low-noise amplifier, generated by the pilot signal generator 42.

The antenna receive signal, pilot signal $Sf_c$ of frequency $f_c$ and the pilot signal $Sf_L$ of frequency $f_L$ are each output from the output terminal 18a and pass through the pilot signal detector 21 of frequency $f_c$ and pilot signal amplifier 43 of frequency $f_L$ in the order mentioned. The detectors 21, 43 detect the levels of the pilot signals of frequencies $f_c$, $f_L$, respectively, and input the detected levels to a fault-location discriminator 51. The latter discriminates fault location in accordance with FIG. 16, which shows a table wherein $Sf_c$=pilot signal of frequency $f_c$, $Sf_L$=detected level of the pilot signal and $l_D$ (dB) as previously defined. Specifically, the fault-location discriminator 51 decides that the refrigerator 15 is normal (see cases 1, 2 and 3) if the pilot signal $Sf_c$ is not detected and decides that the refrigerator 15 has malfunctioned (see cases 4 and 5) if the pilot signal $Sf_c$ of frequency $f_c$ is detected. Further, the fault-location discriminator 51; (1) decides that the refrigerator and amplifier are normal (see case 1) if there is no change in detected level of the pilot signal $Sf_L$; (2) decides that the low-noise amplifier 12 has and is abnormal malfunctioned (see case 2) if the refrigerator is normal and the detected level of the pilot signal $Sf_L$ falls by $L_D$ (dB); (3) decides that the low-noise amplifier 12 has malfunctioned (see case 3) if the refrigerator is normal and the detected level of the pilot signal $Sf_L$ falls by any decibel amount; (4) decides that the low-noise amplifier 12 is normal (see case 4) if the refrigerator is abnormal and the detected level of the pilot signal $Sf_L$ falls by $L_D$ (dB); and (5) decides that the low-noise amplifier 12 also is abnormal if the refrigerator is abnormal (see case 5) and the detected level of the pilot signal $Sf_L$ falls by more than $L_D$ (dB).

Thus, in accordance with the sixth embodiment, it is possible to reliably detect whether the refrigerator has malfunctioned, whether the low-noise amplifier has malfunctioned or whether both have malfunctioned. This is advantageous in that it will suffice to replace the minimum number of faulty parts. In particular, if the level falls by $L_D$ (dB), it is possible to specify the cause, namely whether the level has fallen only by $L_D$ (dB) by chance malfunction of the low-noise amplifier or whether the level has fallen by $L_D$ (dB) due to malfunction of the refrigerator.

(G) Seventh Embodiment

Figure 17:
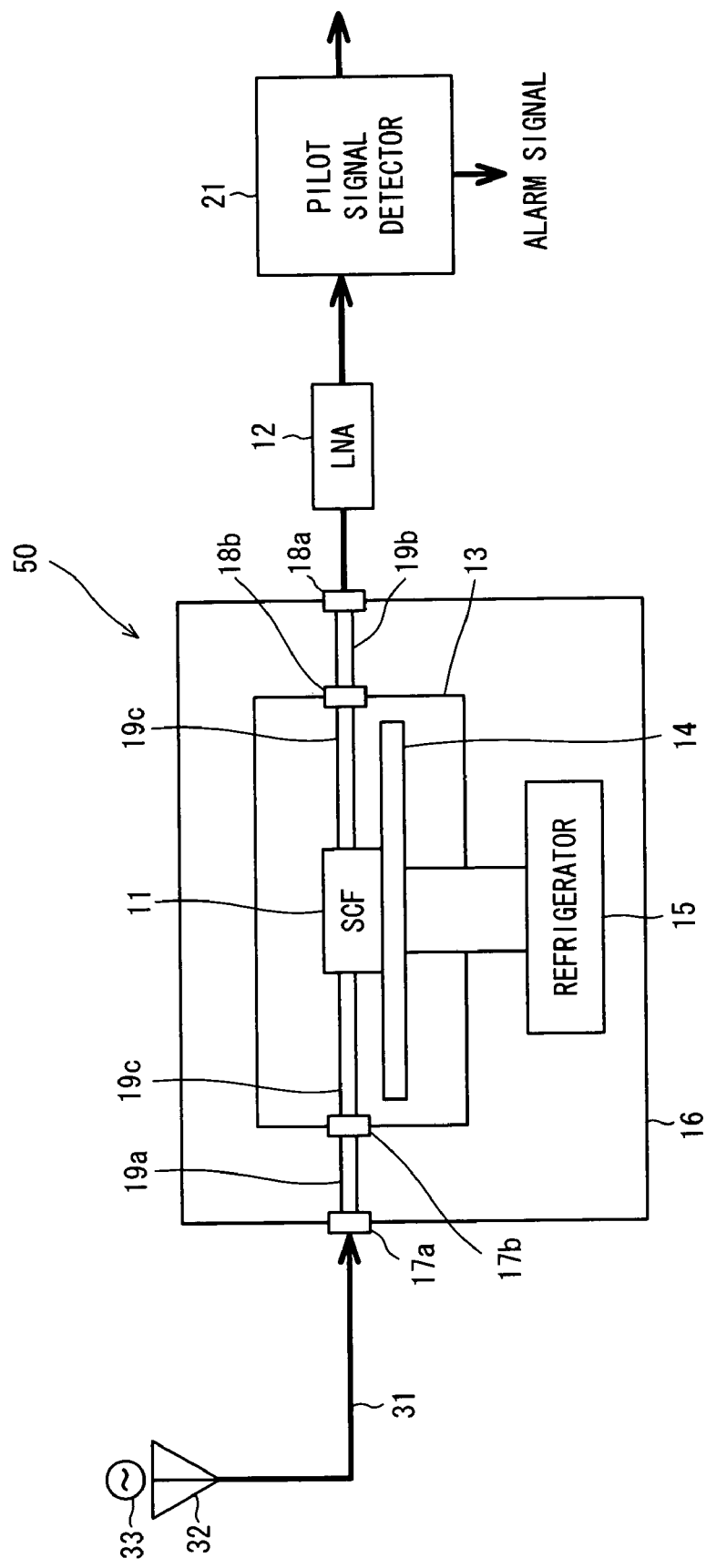
FIG. 17 is a diagram showing the structure of a superconducting filter apparatus in which a low-noise amplifier is installed outside a case.
Figure 18:
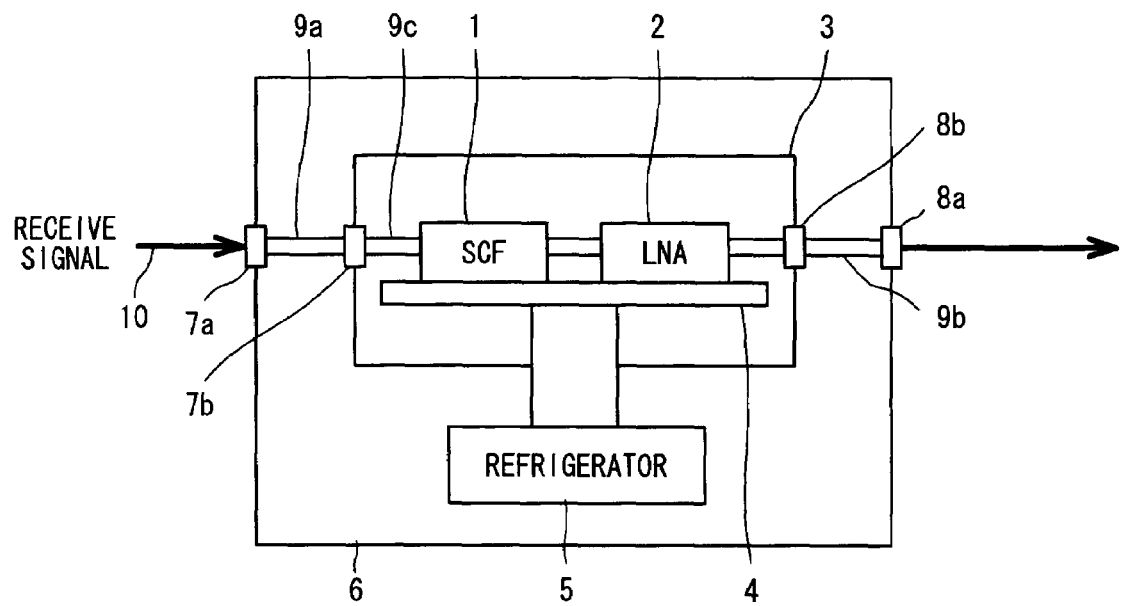
FIG. 18 is a diagram showing the structure of a conventional wireless receiving amplifier having a superconducting filter.
Figure 19:
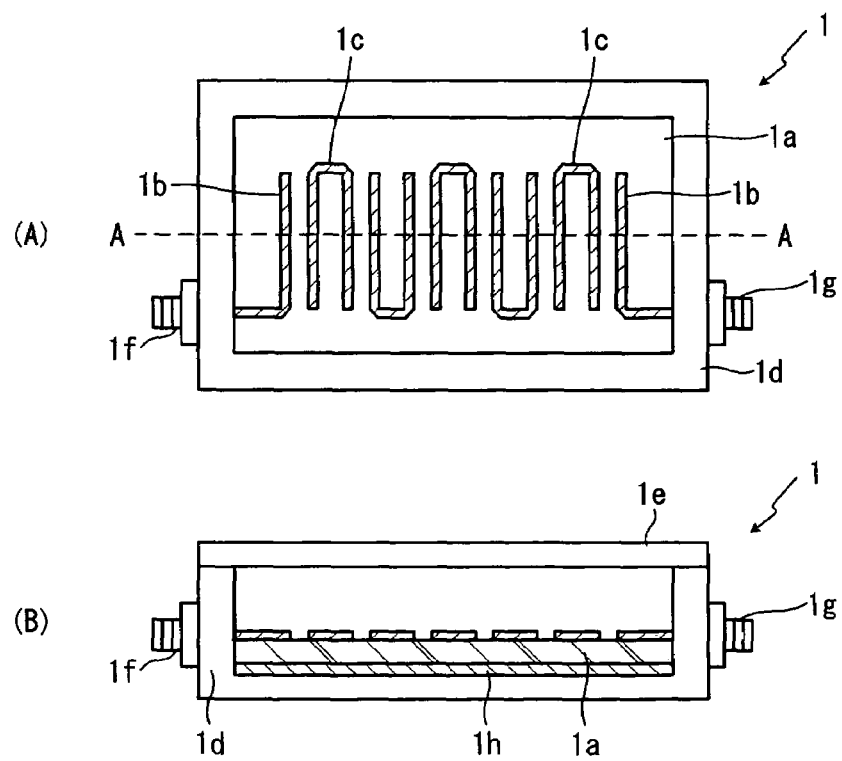
FIGS. 19(A) and 19(B) are diagrams useful in describing the conventional superconducting filter.

In the foregoing, the low-noise amplifier 12 is accommodated within a vacuum vessel and is cooled together with the superconducting filter 11. In each embodiment, however, the low-noise amplifier 12 need not necessarily be cooled and can be provided externally of the case 16. FIG. 17 is an example in which the low-noise amplifier 12 of the second embodiment (see FIG. 6) is placed outside the case 16. Reference numeral 50 denotes a superconducting filter apparatus.

Thus, in accordance with the present invention, it is possible to discriminate and report whether a refrigerator has malfunctioned, the nature of the malfunction and the extent of the malfunction, and it is possible to minimize circumstances in which mobile communication fails.

Further, in accordance with the present invention, refrigerator failure can be detected quickly and reliably. Moreover, since pilot signal inserting means and pilot signal generating means need only be provided as hardware, the superconducting filter apparatus and wireless receiving amplifier can be reduced in size and weight.

Further, in accordance with the present invention, whether the refrigerator or low-noise amplifier has failed, or whether both have failed, can be detected in a reliable manner.

The invention claimed is:

1. A superconducting filter apparatus comprising:
a superconducting filter that exhibits a prescribed passband characteristic when cooled to cryogenic temperatures;
a refrigerator for cooling said superconducting filter to cryogenic temperatures;
a pilot signal generator for generating a first and second pilot signals having different frequencies that are outside said pass band characteristic and inputting said first and second pilot signals to the superconducting filter together with an antenna receive signal; and
a discriminating unit for detecting the level of each pilot signal, and discriminating abnormality in the refrigerator and judging an extent of the abnormality based upon the level of the first and second pilot signals contained in a signal that is output from the superconducting filter.

2. A wireless receiving amplifier for amplifying a signal of a prescribed band in a signal received by an antenna and outputting the amplified signal, comprising:
a superconducting filter that exhibits a prescribed passband characteristic when cooled to cryogenic temperatures;
a low-noise amplifier connected to the output of the superconducting filter for amplifying a signal that is output from the superconducting filter;
a refrigerator for cooling said superconducting filter and low-noise amplifier to cryogenic temperatures;
a first pilot signal generator for generating a first pilot signal having a frequency that is outside said pass band characteristic and inputting said fist pilot signal to the superconducting filter together with an antenna receive signal;
a second pilot signal generator for generating a second pilot signal having a frequency that is outside said pass band characteristic and inputting said second pilot signal to the connection portion between said superconducting filter and said low-noise amplifier; and
a discriminating unit for detecting the level of the first and second pilot signals contained in a signal that is output from the low-noise amplifier and for discriminating abnormality in the refrigerator and low-noise amplifier based upon the level of the first and second pilot signals, respectively.

* * * * *